United States Patent [19]

Salem et al.

[11] Patent Number: 4,629,571
[45] Date of Patent: Dec. 16, 1986

[54] DEOXYGENATION AND PURIFICATION OF LIQUIDS

[75] Inventors: Eli Salem, Deal, N.J.; Robert Kunin, Yardley, Pa.

[73] Assignee: The Graver Company, Union, N.J.

[21] Appl. No.: 774,939

[22] Filed: Sep. 11, 1985

[51] Int. Cl.$^4$ ............................ C02F 1/70; C02F 1/72; B01D 37/02
[52] U.S. Cl. ................................. 210/668; 210/757; 210/763; 210/777
[58] Field of Search ............... 210/663, 668, 669, 679, 210/757, 758, 763, 777, 778

[56] References Cited

U.S. PATENT DOCUMENTS

| | | | |
|---|---|---|---|
| 3,674,686 | 7/1972 | Brimmer et al. | 210/778 |
| 4,056,469 | 11/1977 | Eichenhofer et al. | 210/756 |
| 4,190,532 | 2/1980 | Halbfoster | 210/777 |
| 4,238,334 | 12/1980 | Halbfoster | 210/777 |
| 4,556,492 | 12/1985 | Dickerson et al. | 210/669 |
| 4,574,071 | 3/1986 | De Silva et al. | 210/757 |

Primary Examiner—Ivars Cintins
Attorney, Agent, or Firm—Dressler, Goldsmith, Shore, Sutker & Milnamow

[57] ABSTRACT

A layer of precoat filter aid material including powdered activated carbon removes oxygen and impurities from a liquid having hydrazine added thereto. Oxygen concentrations may be reduced to parts per billion concentrations. Suspended solids can be removed by the precoat layer, and if the precoat layer includes an active particulate material, either as a component of the precoat layer or as an underlayer, the concentration of impurities and dissolved solids in the liquid can also be reduced.

44 Claims, 9 Drawing Figures

FIG_4A_

FIG_4B_

DEOXYGENATION AND PURIFICATION OF LIQUIDS

TECHNICAL FIELD

The present invention relates to the use of a layer of filter material including powdered activated carbon to enhance the removal of oxygen and impurities from a liquid containing hydrazine.

BACKGROUND OF THE INVENTION

Mixed bed systems and precoat filter systems have been used in many industrial applications for the purification of aqueous solutions. One application of such systems is in the purification of water for condensate recirculation systems used to drive steam turbines. It is essential that the water be extremely pure to avoid any adverse effects on the surfaces of blades, boilers and pipes of the high pressure steam system.

It is also desirable to reduce the oxygen concentration of water used in condensate recirculation systems and the like. Dissolved oxygen is often removed from feedwater and condensate to reduce the corrosion of metal surfaces in the boiler and condensate lines. Dissolved oxygen can enter the system with the feedwater or, for example, as a result of a pump seal leak or a condenser leak.

Degasifiers and deaerators can be used to remove oxygen from the feedwater (which is preferably deionized) and the condensate. Oxygen can also be removed by adding chemical scavengers including hydrazine, a catalyzed hydrazine or a hydrazine derivative to the feedwater. Sodium sulfite is also an effective oxygen scavenger. However, unlike hydrazine, sodium sulfite contributes to the build up of the total dissolved solids (TDS) in the water. Thus, the use of hydrazine or a hydrazine-like compound is a preferred means of removing oxygen from an aqueous solution.

Hydrazine is a strong reducing agent that reacts with dissolved oxygen according to the following reaction:

$$N_2H_4 + O_2 \rightarrow 2H_2O + N_2.$$

The formation of hydrogen peroxide may be an intermediate step. The reaction is stoichiometric with unreacted hydrazine breaking down at high temperatures to form ammonia and nitrogen.

The use of hydrazine as a chemical oxygen scavenger has several advantages. In particular, hydrazine and oxygen form water and nitrogen which are relatively inert. At elevated temperatures, hydrazine decomposes to form ammonia, which increases the pH in the boiler water and the condensate. This is advantageous because the reaction of hydrazine and oxygen proceeds more rapidly in solutions having relatively basic pH values. In addition, unlike sodium sulfite, the use of hydrazine does not increase the total dissolved solids (TDS) in the solution.

Power plants often add hydrazine to feedwater or condensate to maintain oxygen concentrations at about 20 parts per billion (ppb) with a residual hydrazine concentration of about 50 ppb. The lower the hydrazine/ammonia residual, the higher the oxygen content of the solution.

Hydrazine also reduces the concentration of metal oxides, such as red iron oxide, at the metal surface by the formation of magnetite.

The reaction between hydrazine and oxygen is rather slow at ambient temperatures (about 20 degrees Centigrade (C.)) and at neutral pH values. The reaction rate, however, is influenced significantly by both temperature and hydroxyl ion concentration. An optimum pH for the reaction is about 10. Various organic and organometallic additives are known to accelerate the reaction. Robinson, J.S., *Corrosion Inhibitors, Recent Developments*, Chemical Technology Review No. 132, Noyes Data Corporation, New Jersey (1979).

Activated carbon is known to catalyze the reaction of hydrazine and oxygen. Ellis et al., *The Reaction Between Hydrazine and Oxygen*, Presented at the International Conference on Hydrazine and Water Treatment, Bouremouth, England (May 1957) and Houghton et al., *The Use of Active Carbon with Hydrazine in the Treatment of Boiler Feed Water*, Presented at the International Conference on Hydrazine and Water Treatment, Burnemouth, England (May 1957). Granular activated carbon, used in a packed bed, is one means of reducing the reaction time required to reduce oxygen to low levels, as compared to the uncatalyzed reaction.

In such prior art processes, hydrazine is added to a liquid containing dissolved oxygen and the liquid is passed through one or more beds of granular activated carbon to catalyze the reaction between the dissolved oxygen and hydrazine. A more efficient process for the removal of dissolved oxygen would include the use of a finely divided or powdered, rather than granular, activated carbon. However, finely divided materials tend to form densely packed beds.

Thus, a need exists for a process whereby the dissolved oxygen concentration of a hydrazine-containing liquid can be reduced efficiently to low (parts per billion) levels by passage of the liquid through activated carbon in a finely divided state.

SUMMARY OF THE INVENTION

The method described herein involves treating an oxygen-containing solution with hydrazine in the presence of a precoat layer comprising a mixture of a filter aid material and powdered activated carbon. The activated carbon-containing precoat filter accelerates the hydrazine/oxygen reaction, even at ambient temperatures, to effectively remove oxygen at the precoat surface.

This configuration has several advantages over systems of the prior art. In particular, oxygen can be removed from solutions to produce low levels of oxygen in the treated solution even at ambient temperatures, suspended solids can be removed from solution and conductivity values of a solution can be reduced particularly when the activated carbon-containing precoat filter is used in conjunction with an ion exchange resin.

As used herein, the term "precoat layer" refers to a thin layer comprising a mixture of filter aid material and powdered activated carbon which is applied to a porous support means (or which is applied to a layer containing an active particulate material applied to a porous support means). The porous support means can be precoated with a slurry comprising the filter aid material in fibrous form and activated carbon in a finely divided or powdered state to form a precoat layer. Thereafter, the liquid can be passed through the precoat layer and the porous support means for purification. The porous support means can comprise a tubular or annular filter element, filter screen or filter bed.

In a preferred embodiment, the porous support means may include wound layers of yarn or other strand material or various types of screening materials; examples of which are described in U.S. Pat. Nos. 3,779,386, 4,269,707 and 4,293,414, each of which is assigned to the assignee of the present invention. The precoating step is accomplished as set forth in U.S. Pat. No. 3,779,386, which patent is assigned to the assignee of the present invention and which is incorporated herein by reference.

The precoat layer prepared in accordance with the present invention may be utilized as an overlay over other types of filter aid materials, or over ion exchange resins, such as described in U.S. Pat. Nos. 3,250,702, 4,177,142 and 4,190,532, each of which is assigned to the assignee of this application and which are incorporated by reference.

The present method can be used to supplement a conventional oxygen treatment apparatus to remove oxygen, particularly when oxygen removal is less than optimal, or in place of a conventional degasification or deaeration assembly.

DETAILED DESCRIPTION

As described herein, a precoat layer including powdered activated carbon is used as a catalyzing surface. With its increased exposed surface area relative to a deep bed containing a comparable amount of material, a lower effluent oxygen concentration at shorter reaction times is possible.

The present invention relates to a method for removing oxygen from a liquid comprising the steps of adding hydrazine to a liquid, preferably an aqueous solution, containing dissolved oxygen; and passing the liquid through a porous support means having an activated carbon-containing precoat layer applied thereto. The precoat layer is applied to the porous support means at a dosage of from about 0.05 to 0.6 pounds per square foot. The precoat layer may be applied as described in U.S. Pat. No. 4,238,334 to Halbfoster, which patent is assigned to the assignee of this application and which is incorporated herein by reference.

The precoat layer comprises a mixture of from about 25 to 80 percent by weight of a fibrous filter aid material and powdered activated carbon. The powdered activated carbon catalyzes the reaction between the dissolved oxygen and the hydrazine so that oxygen is removed from the liquid. As demonstrated herein, the reaction proceeds rapidly at pH values from about 8 to 11, with a pH of about 10-10.5 being preferred.

In a preferred embodiment, the powdered activated carbon comprises at least about 20 percent by weight of the precoat layer. In a more preferred embodiment, the powdered activated carbon comprises from about 30 to 55 percent by weight of the precoat layer.

The filter aid material may include materials such as cellulose fibers, polyacrylonitrile fibers, Teflon fibers, nylon fibers, rayon fibers, orlon fibers, polypropylene fibers and polyvinyl chloride fibers. The dimensions of the fibers are not critical. However, it is often desirable to control the dimensions of the fibers to facilitate precoating onto the porous support means. The fibers of the filter aid material preferably have an average length of from about 10 to 1000 microns.

In a preferred embodiment, the filter aid material comprises from about 40 to 60 percent by weight of cellulose fibers, based on the dry weight of the mixture comprising the precoat layer. The cellulose fibers are commercially available under the trade name Solka-Floc (from Brown Co., New York, N.Y.).

The mixture comprising the precoat layer can further include less than about 20 percent by weight, based on the dry weight of the mixture, of an active particulate material. A wide variety of active particulate materials may be used in accordance with the present invention. Examples include organic polymeric adsorbants, molecular sieves such as zeolite, adsorptive clays such as bentonite, zirconium oxide, zirconium phosphate, activated alumina, ferrous sulfide or diatomaceous earth. Suitable organic polymeric adsorbants include cation and anion exchange resins such as those marketed by Rohm and Haas Co., Philadelphia, Pa. and Dow Chemical Co., Midland, Mich. under the trade names Amberlite IRA 400 and Dowex 50, respectively, and mixtures thereof.

The particle size of the active particulate material will depend upon the particular material being employed. When it is desired to maximize surface area, particles as small as one micron average particle size may be employed in accordance with the present invention. However, it should be understood that the present invention is operative with much larger particles, as large as 300 microns average particle diameter.

After this mixture of fibrous filter aid material and active particulate material has been prepared, it may be deposited on a filter element or other suitable support to form a precoat layer. Alternatively, the mixture may be dewatered or dried and later resuspended prior to being deposited.

The invention also includes a method for removing oxygen from a liquid comprising the steps of preparing a liquid slurry comprising a mixture of fibrous filter aid material and powdered activated carbon, wherein the filter aid material comprises about 25 to 80 percent by weight of the dry weight of the mixture; precoating a porous support means with the slurry to form a precoat layer; adding hydrazine to a liquid containing dissolved oxygen; and passing the liquid through the precoat layer and the porous support means to catalyze a reaction between the dissolved oxygen and the hydrazine whereby oxygen is removed from the liquid.

The above-described parameters of pH, preferred proportions of components, precoat dosages, filter aid materials, active particulate materials and the like also apply to this embodiment.

In a further embodiment of the present invention, an active particulate material may be applied as a first layer (an underlayer) to a porous support means. Thereafter, a second layer (an overlayer) of the present precoat may be applied over the underlayer. The resulting bilayered precoat may be used as described herein to reduce the oxygen concentration of a liquid via the activated carbon-containing overlayer, while the underlayer removes impurities including metal ions, for example, sodium ions, potassium ions, calcium ions, magnesium ions and the like from the liquid. The underlayer may contain the previously described active particulate materials which, of course, include cation and anion exchange resins (and mixtures thereof) recognized by those familiar with ion exchange and water purification technology.

As will be further described herein, the invention also relates to a method for removing hydrazine from a liquid comprising the steps of adding oxygen, such as air or oxygen-containing mixtures (in liquid or gaseous form), to the liquid containing hydrazine; and passing the liquid through a porous support means having a precoat layer of this invention applied thereto.

Table 1 compares the time required for hydrazine to reduce oxygen under various conditions. The data and results in Table 1 are a compilation of information from literature sources (lines 1–4) and from studies conducted according to the present invention (line 5).

the reaction is not complete. The addition of an organic catalyst such as Amerzine reduces the time required for complete reaction to about ten minutes. An activated carbon packed bed reduces the reaction time at room temperature to about 16 seconds for partial removal, and on the order of half a minute or a minute for complete reaction. Finally, use of a treated powdered activated carbon precoat according to the present invention results in complete reaction in less than about 4 seconds at room temperature.

Figure 1:
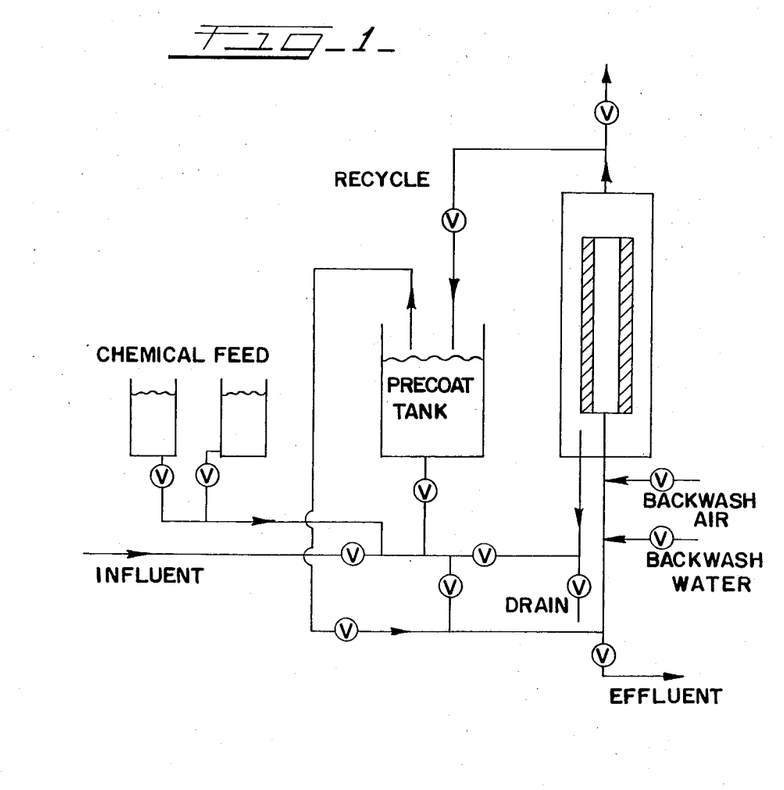
FIG. 1 is a diagrammatic flow chart that illustrates an apparatus for performing the method of the present invention.

Referring to FIG. 1, studies were conducted using a precoat pilot plant system generally indicated by the reference number 10. In service, the inlet stream flows into a vessel 12 containing a precoat element 14 preferably formed of a stainless steel mesh, through the precoat element, and out of the vessel through a center outlet 16 located near the lower portion of the precoat element. A layer of precoat material 18 is applied to the element by recirculating flow from a precoat slurry tank 20, through the precoat element and back to the tank.

Provision is made for the addition of a controlled hydrazine feed to the inlet stream from tank 22 and for the addition of the ammonia or caustic feed for pH control from tank 24. Conventional valves and controls are provided to control the system.

The precoat used herein, as exemplary of precoats that may be used, is a commercially available Ecosorb C product (commercially available from The Graver Company, Union, N.J.) which was selected for its high carbon content. The Ecosorb C product selected contains about 51 percent powdered activated carbon, about 48 percent cellulose fibers (Solka-Floc) and about 1 percent finely divided anion exchange resin in the chloride form. All feed chemicals used herein were ACS reagent grade or the equivalent. For pH adjustment, ammonia and sodium hydroxide from Fisher Scientific, Co., Pittsburgh, Pa. were used.

During these experiments, the flow rate, temperature, pH, oxygen and residual effluent hydrazine were monitored continuously. Conductivity, the total organic content of the solution, and specific ionic constituents (sodium, calcium, magnesium) were selectively monitored.

Oxygen was measured using a polarographic type sensor which was accurate to about 0.5 ppb.

An initial series of tests to determine the effects of flow rate, precoat dosage and pH were performed using

TABLE 1

| | REACTION TIME - HYDRAZINE/OXYGEN | | | | | | |
|---|---|---|---|---|---|---|---|
| Source | Initial Oxygen Concentration | pH | Temp. (degrees F.) | Excess Hydrazine (Percent) | Catalyst | Percent Reaction | Time |
| 1 | Saturated | 10 | 140 (60° C.) | 300 | None | 33 | 2 hrs. |
| 2 | 1 ppm | 9 | 104 (40° C.) | 10 | None | 73 | 100 hrs. |
| 1 | Saturated | 10 | 140 (60° C.) | 300 | Organic[4] | 100 | 10 min. |
| 2 | Saturated | 9 | 68 (20° C.) | 25 | G.A.C.[5] | 89 | 16 sec. |
| 3 | Saturated | 9.5 | 68 (20° C.) | 6 | Ecosorb C[6] | 100 | 4 sec. |

[1]Sexsmith et al., The Use of Catalyzed Hydrazine in Steam Generating Systems, presented at the 1972 International Water Conference, Pittsburgh, PA (October 1972).
[2]Ellis et al., The Reaction Between Hydrazine and Oxygen, presented at the International Conference on Hydrazine and Water Treatment, Bournemouth, England (May 1957).
[3]Studies reported herein.
[4]Amerzine, a commercial product available from Drew Chemical Corp., Parsippany, NJ.
[5]Granular activated carbon.
[6]Ecosorb C which is a commercially available product from The Graver Company, Union, NJ and which comprises about 51 percent powdered activated carbon, about 48 percent cellulose fibers (Solka-Floc) and about 1 percent of a finely divided anion exchange resin in the chloride form.

As indicated in Table 1, with no catalyst present, even at elevated temperature and pH, reaction times were on the order of several to 100 hours; and even then air saturated RO treated water, with a conductivity of about 0.4 micromhos per square centimeter and a pH of about 6.7. The temperature ranged from 19 to 23 degrees Centigrade (C.). Sodium hydroxide was used for pH adjustment.

The make-up water or deionized feedwater and condensate service studies were performed on-site at a major power utility. For treatment of deionized feedwater, the precoat pilot plant was placed after the vessel or vessels containing the anion exchange resin to take advantage of the elevated pH. In condensate operation, the water was treated after passage from the condenser outlet without any prior treatment.

Table 2 shows the various operating conditions of each study.

TABLE 2

GENERAL OPERATING CONDITIONS
Pilot Plant - 0.38 ft$^2$ Stainless Steel element
Precoat - Ecosorb C (The Graver Company, Union, NJ)

| Operating Conditions | R.O. Treated | Make-up | Condensate |
|---|---|---|---|
| Inlet O$_2$: | Saturated | 0.2–8 ppm | 300 ppb |
| Inlet pH: | Neutral (6.7) | 9.3–10.0 | 7.8–8.5 |
| Precoat Dosage (lbs/ft$^2$) | 0.1–0.6 | 0.4 | 0.1–0.2 |
| Flow Rate (gpm/ft$^2$): | 1.0–3.0 | 1.0–2.0 | 2.0–4.0 |
| Hydrazine (excess ppm): | 0.5–2.0 | 0.5–1.0 | 0.05–0.10 |
| Temp. (°C.) | 19–23 | 23–35 | 35–48 |

Note that the deionized feedwater which typically has a high (saturated) oxygen concentration and low temperature, was treated at relatively low flow rates and high pH values. Condensate operation, on the other hand, with a relatively low oxygen concentration of only several hundred ppb, high temperature and slightly elevated pH was performed at higher flow rates and lower precoat dosage.

Based on conductivity considerations, the addition of reagents to control pH may not be desirable in certain power plant applications, therefore, no pH adjustment was made during the condensate studies.

A. Conditions Affecting Oxygen Reduction

Kinetic aspects of the reaction between hydrazine and oxygen present the limiting factor in the practical application of the precoat process for treatment of oxygen. The extent of oxygen removal will depend on those factors which determine total contact time between the feed stream and the precoat, along with those factors which actually affect the rate of the reaction.

The reaction rate is influenced significantly by both pH and temperature, with or without a catalyst. Sexsmith et al., *The Use of Catalyzed Hydrazine in Steam Generating Systems*, Presented at the 1972 International Water Conference, Pittsburgh, Pa. (October 1972). Previous investigators have demonstrated a pH between 9 and 10 as optimum (Ellis et al. and Sexsmith et al., id.). As described herein, a pH value of 10 to 10.5 was found to be optimum. Increasing the pH much above 10.5 improved oxygen removal only slightly. With respect to temperature, performance increased with increasing temperature over the entire range encountered in the course of this study, i.e., from about 19 degrees C. to about 48 degrees C.

1. Removal of Dissolved Oxygen from Reverse Osmosis (R.O.) Treated Water

Water treated by reverse osmosis (R.O.) to remove impurities was passed through a precoat layer prepared according to this invention with Ecosorb C. Temperature was maintained at about 21 degrees C., and oxygen concentration was about 8 ppm (saturated). Hydrazine was fed at a rate sufficient to maintain a residual hydrating concentration of about 0.5 to 1 ppm.

Figure 2:
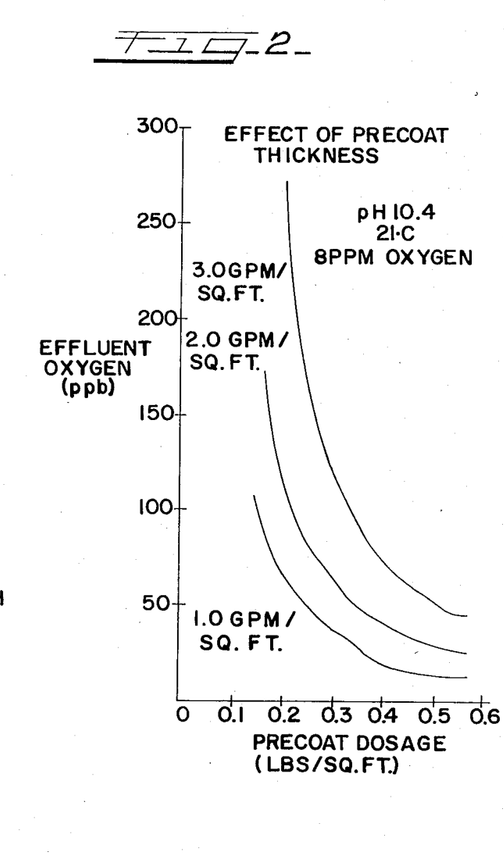
FIG. 2 is a graph that illustrates the effluent oxygen concentration (in parts per billion) of a liquid at various flow rates as a function of precoat dosage, i.e., precoat thickness (in pounds per cubic foot) upon the treatment of the liquid with a precoat layer of this invention.

The effect of contact time, as determined by flow rate and precoat dosage at pH 10.4, is shown in FIG. 2 and in Table 3.

TABLE 3

CONTACT TIME VERSUS EFFLUENT OXYGEN

| Precoat Dosage (lbs/sq. ft.) | Flow Rate (gpm/sq. ft.) | Contact Time (seconds) | Effluent O$_2$ (ppb) |
|---|---|---|---|
| 0.2 | 1.0 | 3.6 | 75 |
|  | 2.0 | 1.8 | 130+ |
|  | 3.0 | 1.2 | 300 |
| 0.3 | 1.0 | 5.3 | 40–50 |
|  | 2.0 | 2.7 | 60–80 |
|  | 3.0 | 1.8 | 120–180 |
| 0.4 | 1.0 | 7.2 | 15–25 |
|  | 2.0 | 3.6 | 40–60 |
|  | 3.0 | 2.4 | 80–85 |
| 0.6 | 1.0 | 9.0 | 10–20 |
|  | 2.0 | 4.5 | 20–35 |
|  | 3.0 | 3.0 | 30–50 |

Inlet: Reverse osmosis (R.O.) treated feedwater saturated with O$_2$ (about 8 ppm)
pH = 10.4 adjusted with sodium hydroxide
Temperature = 19–23 degrees C.

As shown in Table 3, the effluent oxygen concentration was dependent on both the flow rate and the thickness of the precoat layer. Adjusting either one to increase the contact time resulted in a lower effluent oxygen concentration.

Referring to FIG. 2, at a given flow rate the higher precoat dosages reduced the effluent oxygen concentrations to lower levels.

Figure 3:
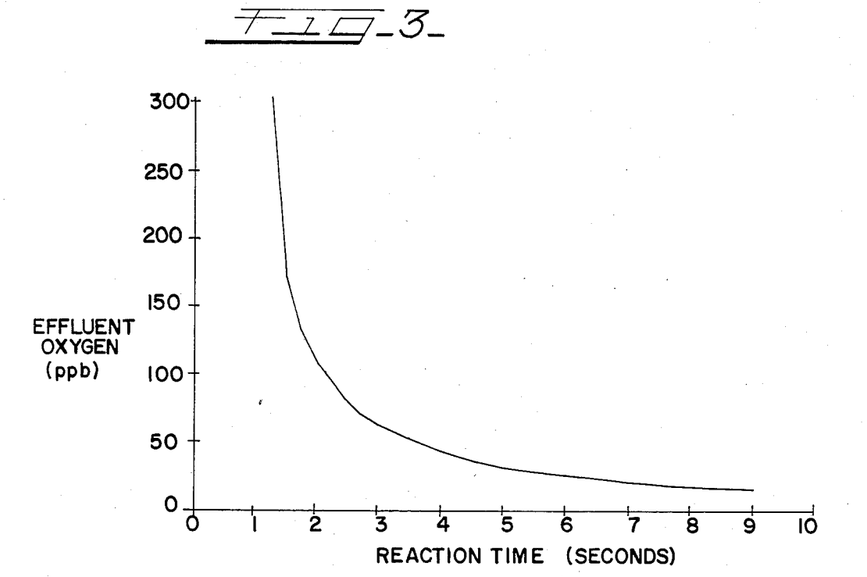
FIG. 3 is a graph that illustrates the oxygen concentration (in parts per billion) of a liquid treated with a precoat layer of this invention as a function of time (in seconds).

The combined effect of flow rate and precoat dosage is shown in FIG. 3 in terms of contact time. Excellent reduction of dissolved oxygen concentrations (greater than 99 percent) is achieved with contact times as short as 3 seconds.

Figure 4A:
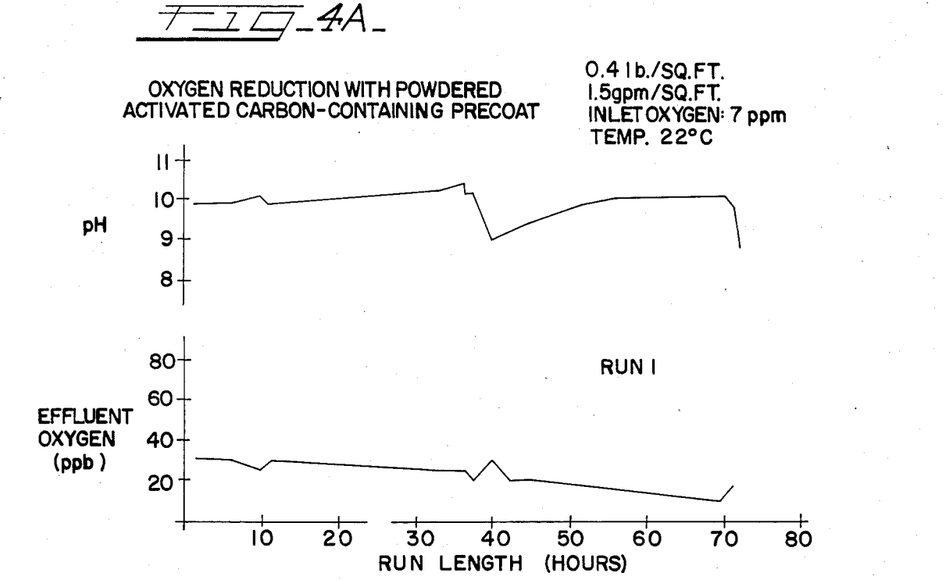
FIG. 4A is a graph in two parts of a first study that illustrates both pH and effluent oxygen concentration (in parts per billion) of a liquid treated with a precoat layer of this invention as a function of run length (in hours).
Figure 4B:
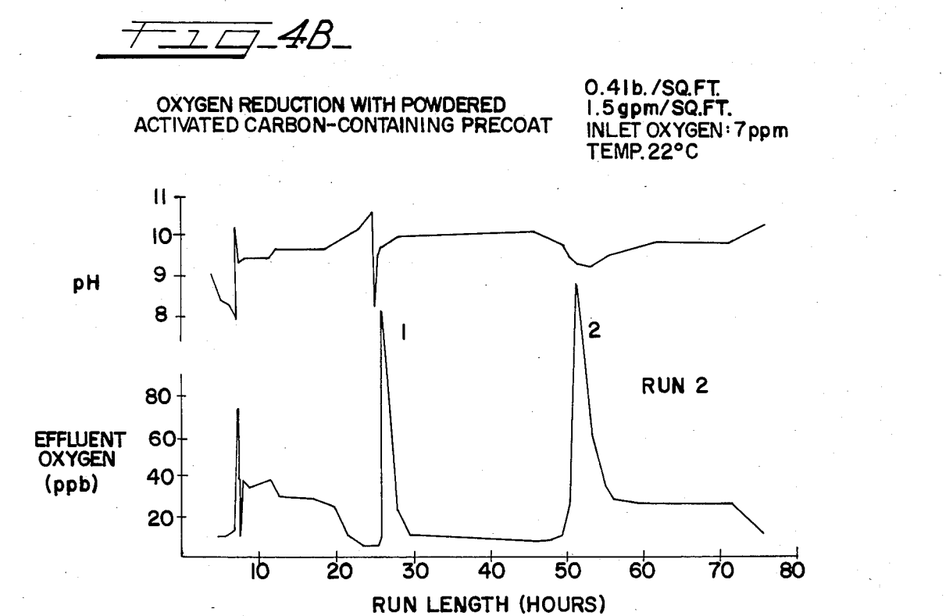
FIG. 4B is a graph in two parts of a second study that illustrates both pH and effluent oxygen concentration (in parts per billion) of a liquid treated with a precoat layer of this invention as a function of run length (in hours).

FIGS. 4A and 4B show the results of additional studies that were performed to determine the effluent quality possible during continuous operation of the system over an extended period of time. The inlet feedwater in each case was an air saturated R.O. treated well water at a temperature of 19 to 23 degrees C. The pH was adjusted using sodium hydroxide, and hydrazine was added at a rate sufficient to maintain a residual hydrazine concentration of about 0.5 to 1 ppm.

The two studies show that low oxygen concentrations can be obtained for at least three days. Both studies were terminated due to pressure drop rather than as a result of decreasing performance. The optimum pH again appeared to be from about 10.0 to 10.5.

As shown in FIG. 4B, however, the strong dependence of oxygen removal on pH at this temperature was quite evident in the second study. During the second study, mechanical problems were experienced with the pH control. As illustrated in FIG. 4B, when the pH of the feedwater was reduced to a value of about 8, the amount of oxygen removed from the feedwater was reduced relative to the amount removed at, for example, pH 10. Once the pH was readjusted to about 10 or 10.5, the oxygen level was reduced to levels of less than 20 parts per billion.

Moreover, as demonstrated by the comparison of peaks 1 and 2 of FIG. 4B, a pH change has a more significant effect on oxygen removal when the precoat filter is used for longer periods of time in a continuous process.

2. Removal of Dissolved Oxygen from Deionized Feedwater

Table 4 summarizes the results of on-site testing at a major power utility using make-up deionized feedwater.

TABLE 4
TREATMENT OF DEIONIZED FEEDWATER
Precoat Dosage = 0.4 pounds per square foot

| | Flow gpm/ft$^2$ | Temp. (°C.) | pH | O$_2$ Inlet (ppb) | O$_2$ Outlet (ppb) |
|---|---|---|---|---|---|
| Precoat 1 (with degasifier) | 1.0 | 25 | 9.5 | 300 | 1-9 |
| | 2.0 | 29 | 9.7 | 300 | 22 |
| Precoat 2 (without degasifier) | 1.0 | 23 | 10.8* | 5300 | 15-25 |
| | 1.0 | 33 | 10.0* | 5300 | 2-4 |
| | 1.0 | 33 | 9.6 | 5300 | 15 |
| | 2.0 | 35 | 10.7* | 5300 | 3-5 |
| | 2.0 | 23 | 9.5 | 5300 | 250-320 |

*pH adjusted with NaOH

Treatment of the deionized feedwater included passing the feedwater through clarification and anthracite filters, followed by passage through cation, anion and mixed bed ion exchange resins. A vacuum degasifier was positioned after the vessel holding the cation exchange resin to reduce carbon dioxide loading on the anion exchange resin.

With the degasifier in operation, oxygen concentrations ranged from about 100 to about 300–400 micromhos (city water). The vessel containing the precoat filter was placed after the vessel holding the anion exchange resin of the demineralizer plant to take advantage of the elevated pH. Conductivity testing was performed both with and without the degasifier of the demineralizer plant in operation.

A precoat dosage of 0.4 pounds of precoat per square foot of the precoat filter and a flow rate of 1 to 2 gallons per minute (gpm) per square foot were chosen as a compromise between maximum oxygen removal, realistic precoat dosage and treatment throughput. These represent contact times of about 7.2 and 2.6 seconds, respectively.

Results show that feedwater that is either relatively saturated (5-7 ppm) or contains low concentrations (0.5 ppm) of oxygen can be reduced to low levels of oxygen under these conditions. Reduction of high oxygen concentrations is more sensitive to pH, temperature and precoat age than the reduction low oxygen concentrations.

Figure 5:
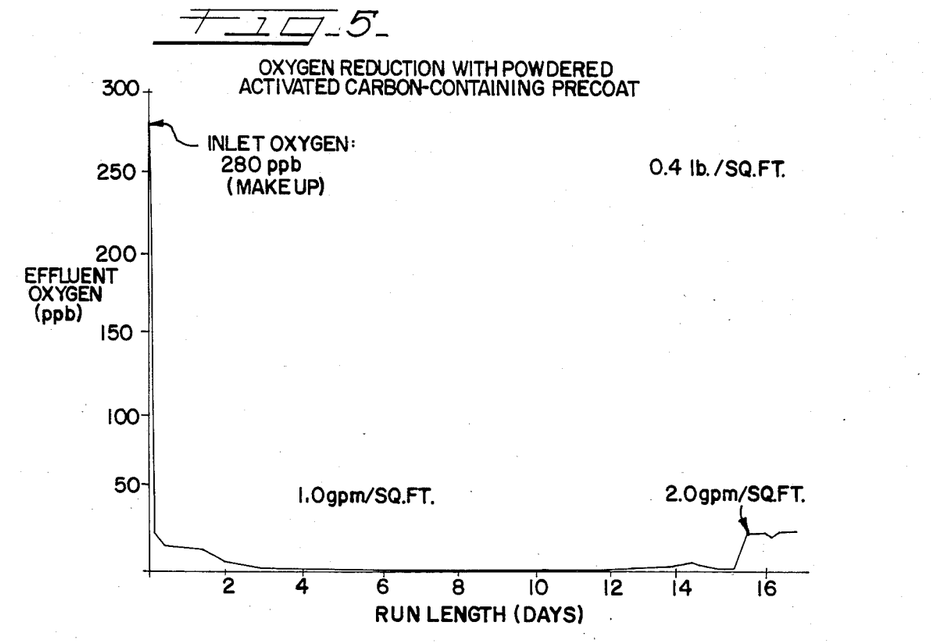
FIG. 5 is a graph that illustrates the oxygen concentration (in parts per billion) of a liquid treated with a precoat layer of this invention as a function of run length (in days).

Further results using precoat filters are shown in FIG. 5. With an inlet oxygen concentration of about 300 ppb oxygen (with the degasifier in operation), oxygen concentrations were reduced to about 1 to 22 ppb, at pH 9.5 to 9.7, depending on flow rate. Effective run length was over 16 days, with no observable loss in performance. Pressure drop remained below 2 pounds per square inch (psi) throughout the study.

With a saturated oxygen concentration for the inlet feedwater, effluent oxygen concentration values from about 3 to 25 ppb were observed, depending on the flow rate, temperature and pH of the solution. The least favorable set of conditions (low temperature, low pH and high flow rate) resulted in an oxygen concentration of about 300 ppb.

At a higher temperature (35 degrees C.) and a relatively high pH (about pH 9.0–10.0), flow rate is less critical and the effluent oxygen concentration was about 5 ppb at both 1 and 2 gpm per square foot. At lower temperatures, it is necessary to maintain a high pH and a low flow rate. The effective run length was 4 days for treatment of solutions having high oxygen concentrations, with performance deteriorating gradually after that time.

3. Removal of Dissolved Oxygen from Condensate Water

Condensate operation involves higher temperatures (usually less than about 200° F.) and lower oxygen concentrations (ppb levels rather than ppm levels) than the treatment of deionized feedwater, with more stringent restrictions on conductivity values. A higher operating flow rate (usually less than about 10 gpm per square foot) and a lower precoat dosage (for example, less than about 0.4 pounds per square foot) are therefore both possible and desirable, especially if the activated carbon-containing precoat is to be used on existing condensate treatment equipment.

The precoat filter assembly including the previously described Ecosorb C product was placed at the condenser outlet, before treatment. Depending on the plant configuration, the preferred placement of the precoat layer is at the condenser outlet or at the condensate storage tank. Referring to Table 5, condensate pH ranged from about 7.8 to about 8.4, and the temperature of the solution was from about 40 to 48 degrees C. Oxygen concentration was somewhat high for condensate at this point, about 300 ppb to 400 ppb. Hydrazine was maintained at a much lower residual concentration than in the treatment of deionized feedwater since many plants require a hydrazine residual in the condensate of no greater than 50 ppb.

Table 5 summarizes the results of condensate service, using precoats coated at 0.1 and 0.2 pounds per square foot. Flow rates were varied from about 2.0 to 4.0 gpm per square foot, which represents a range of contact times from about 0.5 to 1.8 seconds. An Ecosorb C-containing precoat filter was used.

It will be noted that Ecosorb C, as previously described, includes about 1 percent of an anion exchange resin in the chloride form as an active particulate material. It may be preferred, however, in certain condensate polishing applications to use an anion exchange resin in the hydroxide form to minimize the concentration of chloride ions in the solution. Suitable anion exchange resins include Amberlite IRA 400 (Rohm and Haas Co., Philadelphia, Pa.) and Dowex SBR (Dow Chemical Co., Midland,. Mich.).

Moreover, by using an anion exchange resin in the hydroxide form as a component of the mixture that forms the precoat layer, anion exchange resin is in intimate contact with the powdered activated carbon. This has the effect of increasing the pH of the aqueous solution in the immediate vicinity of the activated carbon to promote the hydrazine/oxygen reaction. Such a precoat layer may be used when it is desired to remove oxygen from a liquid by reaction with hydrazine (a reaction that proceeds best at relatively high pH values of about 8 to 11) without raising the pH of the bulk liquid. Thus, oxygen may be removed from the liquid with hydrazine at ambient temperatures and at relatively neutral pH values (less than 8) without adding electrolytes to the liquid.

TABLE 5
CONDENSATE SERVICE

| Precoat Dosage (lbs/sq. ft.) | Flow Rate gpm/sq. ft. | pH | Temp. (°C.) | $O_2$ Inlet (ppb) | $O_2$ Outlet (ppb) |
|---|---|---|---|---|---|
| 0.2 | 2.0 | 8.2 | 40 | 300 | 6 |
| | 3.5 | 8.0 | 43 | 300 | 0.5 |
| | 4.0 | 8.4 | 43 | 300 | 1 |
| 0.1 | 2.0 | 8.3 | 46 | 300 | 1 |
| | 3.0 | 8.2 | 47 | 300 | 1 |
| | 4.0 | 8.3 | 48 | 300 | 4 |

The results shown in Table 5 demonstrate that the high temperature of the condensate allows oxygen reduction to less than 5 ppb, even at these low contact times and relatively low pH values. An effluent oxygen concentration of less than about 1 ppb was achieved at temperatures of about 45 degrees C.

Figure 7:
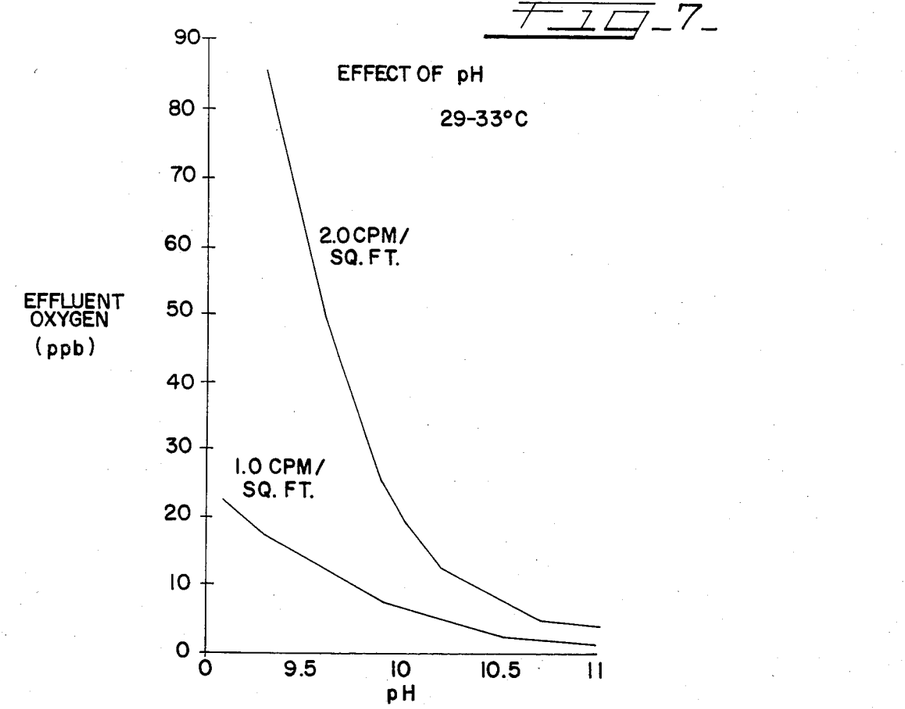
FIG. 7 is a graph that illustrates the oxygen concentration (in parts per billion) of a liquid treated with a precoat layer of this invention as a function of pH.

The effect of pH on the removal of oxygen from condensate is shown in FIG. 7. At a temperature in the range of 29 to 33 degrees, the effluent oxygen concentration of condensate having an inlet oxygen concentration of about 300 ppb was reduced to less than 10 ppb at a flow rate of 1.0 GPM per square foot and a pH of about 9-11. Under the same conditions, but at a flow rate of about 2.0 GPM per square foot, the effluent oxygen concentration was less than 10 ppb only in the pH range of about 10-11. The Ecosorb C precoat layer used to provide the results of FIG. 7 was applied at a dosage of about 0.1 pounds per square foot.

Figure 8:
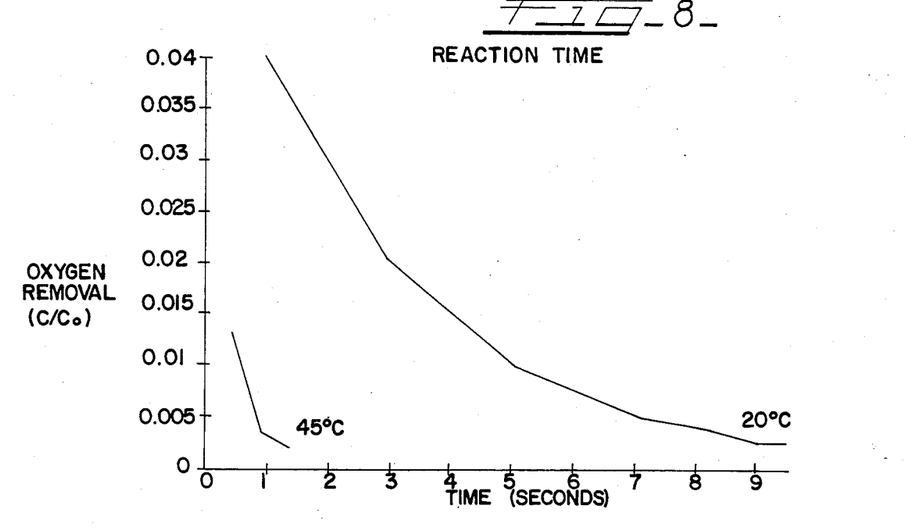
FIG. 8 is a graph that illustrates a normalized oxygen removal (C/Co) of a liquid treated with a precoat layer of this invention as a function of time (seconds) at 20 degrees C. and at 45 degrees C.

Referring to FIG. 8, the effects of temperature on oxygen removal are shown. In particular, trials were run at 20 degrees C. and at 45 degrees C. using a precoat prepared as in FIG. 7. A comparison of the normalized oxygen removal (C/Co), i.e., effluent/influent oxygen concentration, versus reaction time (in seconds) shows that the removal of oxygen from the condensate is substantially complete in less than 2 seconds at 45 degrees C. and in less than 10 seconds at 20 degrees C.

B. Total Organic Content (TOC) Removal

Activated carbon may be used to remove organic compounds from water. Adsorption is dependent upon the nature of the particular organic compound being treated; the molecular weight, polarity, and branching of the organic compound; and on the physical form of the carbon.

Figure 6:
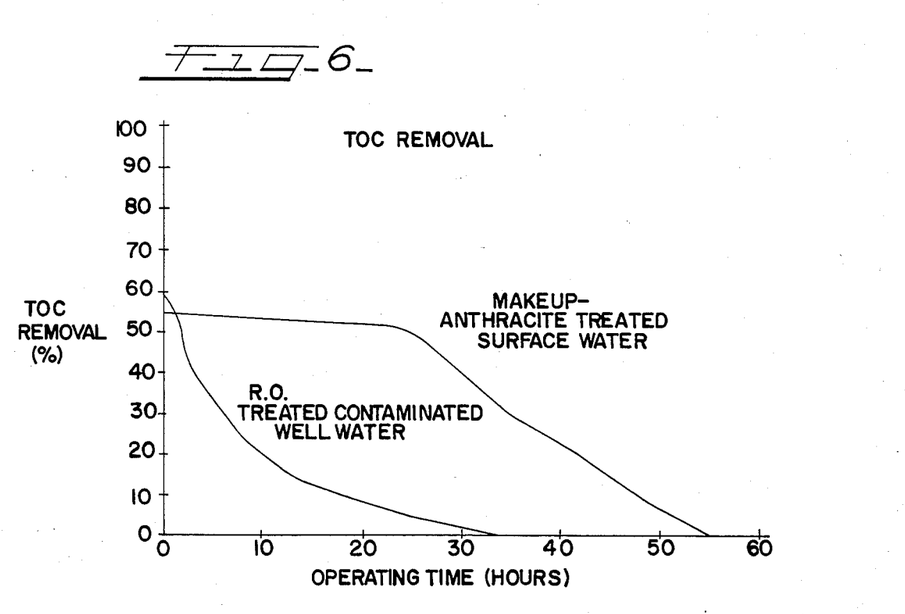
FIG. 6 is a graph that illustrates total organic content (TOC) removed (in percent) as a function of operating time (in hours) for reverse osmosis (R.O.) treated well water and deionized feedwater (makeup)-anthracite treated.

FIG. 6 shows the TOC removal with time during two of the oxygen reduction studies. In the first study, the inlet feedwater comprised well water contaminated with about 0.5 ppm to 1.0 ppm of low molecular weight halocarbons and was pretreated by reverse osmosis. R.O. effluent contained about 0.25 ppm organic carbon, which is nominal with resulting molecular weight cutoff of 200.

An Ecosorb-C precoat layer was somewhat effective at removing these organic compounds. An initial reduction of about 50 percent dropped off rapidly to substantially no removal after about 24 hours.

In the second study, the inlet feedwater comprised anthracite-treated cation/anion exchange effluents containing about 0.5 ppm carbon. Inlet water to the anthracite had originally contained 2 ppm carbon with almost no reduction by the anthracite filters. Inlet water to the precoat filter, however, contained only 0.5 ppm carbon which indicated removal of organic compounds by the ion exchange units. Subsequent reduction in the reduction of organic compounds by the precoat was about 50 precent, which lasted for about 2 days, and then dropped off to substantially no removal after 4 days of operation.

C. Removal of Hydrazine from Liquids

The precoat filter of the present invention may also be used to remove hydrazine from liquids. In certain applications, such as condensate polishing, a residual hydrazine concentration is desirable. However, in other applications it may be preferred to have no hydrazine in the circulating liquid or aqueous solution.

According to a further embodiment, an inlet means may be provided before the precoat layer to add oxygen to an oxygen-depleted, circulating liquid. The added oxygen can react with the residual hydrazine upon passage through the precoat layer. In this manner, hydrazine is removed from the liquid and the liquid has a residual oxygen concentration. Specifically, the method for removing hydrazine from a liquid comprises the steps of adding oxygen to the liquid containing hydrazine; and passing the liquid through a porous support means having a precoat layer of this invention applied thereto.

Thus, if the amount of added hydrazine or oxygen is properly controlled, the residual hydrazine and oxygen concentrations can be strictly regulated using a precoat layer of this invention.

D. Conclusion

1. Treatment of Deionized Feedwater

At lower temperatures and high oxygen concentrations (1 ppm) as encountered in the treatment of deionized feedwater, it is necessary to operate at a low flow rate and high precoat dosage to maximize contact time. A precoat layer applied at a dosage of about 0.4 pounds per square foot was used herein. Higher dosages are possible but are limited by the physical dimension of the equipment together with operating costs. The highest precoat dosage used in these examples was 0.6 pounds per square foot.

Oxygen removal at low temperatures is also sensitive to both pH and hydrazine. A pH of about 9.5 to 10.0 is required depending on the actual temperature. An excess of hydrazine (about 1 ppm) seems to be required. Ideal placement of the precoat filter is after an anion exchanger to take advantage of the resulting higher pH. If necessary, ammonia or caustic can be used to adjust the pH, but this is limited by conductivity and/or cation loading constraints.

2. Treatment of Condensate Water

Treatment on the condensate cycle is greatly simplified due to the higher temperature and lower oxygen typically present. The precoat system can be operated at a high flow rate (3 to 4 gpm per square foot) and with a low precoat dosage of about 0.1 pounds per square foot. The pH seems less critical, and good results are obtained at pH values as low as 7.7. The required hydrazine residual is less than 60 ppb. Under these conditions, an effluent oxygen concentration of less than 1 ppb is achieved.

The carbon used in Ecosorb-C has a low silica and ash content. However, under adverse conditions (low flow rate and high temperature) effluent silica or conductivity throw may be of concern. An underlayer of a mixture of a cation exchange resin in the ammonium or hydrogen form and an anion exchange resin in the hydroxide form can be used to insure against conductivity or silica leakage.

3. TOC Reduction

Depending on the type of water treated, TOC may be partially reduced to varying degrees by the precoat layer. On a once through basis, the reduction would be less than ideal. However, with a recirculating loop or sidestream treatment, sufficient TOC reduction in the condensate may be achieved. This would be dependent on flow rate and the source of organic contaminants. This type of application may be particularly effective in the treatment of radioactive waste.

While the present invention has been described with reference to particular embodiments, it will be understood that various changes and modifications can be made without departing from the spirit thereof, particularly as defined in the following claims.

What is claimed is:

1. A method for removing oxygen from a liquid comprising the steps of:
   (a) adding hydrazine to a liquid containing dissolved oxygen; and
   (b) passing the liquid through a porous support means having a precoat layer applied thereto comprising a mixture of filter aid material and powdered activated carbon, wherein the filter aid material comprises about 25 to 80 percent by weight of the precoat layer, based on the dry weight of the mixture, to catalyze a reaction between the dissolved oxygen and the hydrazine whereby oxygen is removed from the liquid.

2. The method according to claim 1 wherein the powdered activated carbon comprises at least about 20 percent by weight of the precoat layer, based on the dry weight of the mixture.

3. The method according to claim 1 wherein the powdered activated carbon comprises from about 30 to 55 percent by weight of the precoat layer, based on the dry weight of the mixture.

4. The method according to claim 1 wherein the precoat layer is applied to the porous support means at a dosage of from about 0.05 to 0.6 pounds per square foot.

5. The method according to claim 1 wherein said filter aid material is selected from the group consisting of cellulose fibers, polyacrylonitrile fibers, Teflon fibers, nylon fibers, rayon fibers, orlon fibers, polypropylene fibers and polyvinyl chloride fibers.

6. The method according to claim 1 wherein said filter aid material comprises from about 40 to 60 percent by weight of cellulose fibers, based on the dry weight of the mixture.

7. The method according to claim 1 wherein the filter aid material includes fibers having an average length of from about 10 to 1000 microns.

8. The method according to claim 1 wherein the mixture comprising the precoat layer further includes less than about 20 percent by weight, based on the dry weight of the mixture comprising the precoat layer, of an active particulate material.

9. The method according to claim 8 wherein the active particulate material is selected from the group consisting of organic polymeric adsorbants, zeolites, bentonite, zirconium oxide, zirconium phosphate, activated alumina, ferrous sulfide and diatomaceous earth.

10. The method according to claim 8 wherein the active particulate material comprises an anion exchange resin in the chloride form.

11. The method according to claim 8 wherein the active particulate material comprises an anion exchange resin in the hydroxide form.

12. The method according to claim 1 wherein the liquid comprises an aqueous solution.

13. The method according to claim 1 wherein the liquid is maintained at a pH from about 8 to 11.

14. The method according to claim 1 wherein the liquid is maintained at a pH of about 10.

15. A method for removing oxygen and impurities from a liquid having a pH from about 8 to 11 comprising the steps of:
   (a) adding hydrazine to the liquid which contains dissolved oxygen; and
   (b) passing the liquid through a porous support means having a precoat layer applied thereto comprising a mixture of from about 25 to 80 percent by weight of a fibrous filter aid material, at least about 20 percent by weight of powdered activated carbon and less than about 20 percent by weight of an active particulate material, based on the dry weight of the mixture, to catalyze a reaction between the dissolved oxygen and the hydrazine whereby oxygen and the impurities are removed from the liquid.

16. The method according to claim 15 wherein the powdered activated carbon comprises from about 30 to 55 percent by weight, based on the dry weight of the mixture.

17. The method according to claim 15 wherein the precoat layer is applied to the porous support means at a dosage of from about 0.05 to 0.6 pounds per square foot.

18. A method according to claim 15 wherein said filter aid material is selected from the group consisting of cellulose fibers, polyacrylonitrile fibers, Teflon fibers, nylon fibers, rayon fibers, orlon fibers, polypropylene fibers and polyvinyl chloride fibers.

19. A method according to claim 15 wherein said filter aid material comprises from about 40 to 60 percent by weight of cellulose fibers, based on the dry weight of the mixture.

20. A method according to claim 15 wherein the fibers of the filter aid material have an average length of from about 10 to 1000 microns.

21. A method according to claim 15 wherein the active particulate material is selected from the group consisting of organic polymeric adsorbants, zeolites, bentonite, zirconium oxide, zirconium phosphate, activated alumina, ferrous sulfide and diatomaceous earth.

22. A method according to claim 15 wherein the liquid comprises an aqueous solution.

23. A method for removing oxygen from a liquid comprising the steps of:
   (a) preparing a liquid slurry comprising a mixture of fibrous filter aid material and powdered activated carbon, wherein the filter aid material comprises about 25 to 80 percent by weight, based on the dry weight of the mixture;
   (b) precoating a porous support means with the slurry to form a precoat layer;
   (c) adding hydrazine to a liquid containing dissolved oxygen; and
   (d) passing the liquid through the precoat layer and the porous support means to catalyze a reaction between the dissolved oxygen and the hydrazine whereby oxygen is removed from the liquid.

24. The method according to claim 23 wherein the powdered activated carbon comprises at least about 20 percent by weight, based on the dry weight of the mixture.

25. The method according to claim 23 wherein the powdered activated carbon comprises from about 30 to 55 percent by weight, based on the dry weight of the mixture.

26. The method according to claim 23 wherein the porous support means is precoated with the slurry at a dosage of about 0.05 to 0.6 pounds of the mixture per square foot, of the porous support means.

27. The method according to claim 23 wherein the liquid is passed through the precoat layer and the porous support means at a temperature less than about 200° F. and at a flow rate of less than about 10 gallons per minute per square foot.

28. The method according to claim 23 wherein said filter aid material is selected from the group consisting of cellulose fibers, polyacrylonitrile fibers, Teflon fibers, nylon fibers, rayon fibers, orlon fibers, polypropylene fibers and polyvinyl chloride fibers.

29. The method according to claim 23 wherein said filter aid material comprises from about 40 to 60 percent by weight of cellulose fibers, based on the dry weight of the mixture.

30. The method according to claim 23 wherein the fibers of the filter aid material have an average length of from about 10 to 1000 microns.

31. The method according to claim 23 wherein the precoat layer further includes less than about 20 percent by weight, based on the dry weight of the mixture, of an active particulate material.

32. The method according to claim 23 wherein the active particulate material is selected from the group consisting of organic polymeric adsorbants, zeolites, bentonite, zirconium oxide, zirconium phosphate, activated alumina, ferrous sulfide and diatomaceous earth.

33. The method according to claim 23 wherein the liquid comprises an aqueous solution.

34. The method according to claim 23 wherein the liquid is maintained at a pH from about 8 to 11.

35. The method according to claim 23 wherein the liquid is maintained at a pH of about 10.

36. A method for removing oxygen and impurities from a liquid having a pH from about 8 to 11 comprising the steps of:
(a) preparing a liquid slurry comprising a mixture from about 25 to 80 percent by weight of a fibrous filter aid material, at least about 20 percent by weight of powdered activated carbon and less than about 20 percent by weight of an active particulate material, based on the dry weight of the mixture;
(b) precoating a porous support means with the slurry at a dosage of from about 0.05 to 0.6 pounds per square foot to form a precoat layer;
(c) adding hydrazine to a liquid containing dissolved oxygen; and
(d) passing the liquid through the precoat layer and said porous support means to catalyze a reaction between the dissolved oxygen and the hydrazine whereby oxygen and the impurities are removed from the liquid.

37. The method according to claim 36 wherein the powdered activated carbon comprises from about 30 to 55 percent by weight, based on the dry weight of the mixture.

38. A method according to claim 36 wherein said filter aid material is selected from the group consisting of cellulose fibers, polyacrylonitrile fibers, Teflon fibers, nylon fibers, rayon fibers, orlon fibers, polypropylene fibers and polyvinyl chloride fibers.

39. A method according to claim 36 wherein said filter and material comprises from about 40 to 60 percent by weight of cellulose fibers, based on the dry weight of the mixture.

40. A method according to claim 36 wherein the fibers of the filter aid material have an average length of from about 10 to 1000 microns.

41. A method according to claim 36 wherein the active particulate material is selected from the group consisting of organic polymeric adsorbants, zeolites, bentonite, zirconium oxide, zirconium phosphate, activated alumina, ferrous sulfide and diatomaceous earth.

42. A method according to claim 36 wherein the liquid comprises an aqueous solution.

43. A method for removing hydrazine from a liquid comprising the steps of:
(a) adding oxygen to the liquid containing hydrazine; and
(b) passing the liquid through a porous support means having a precoat layer applied thereto comprising a mixture of fibrous filter aid material and powdered activated carbon, wherein the filter aid material comprises about 25 to 80 percent by weight of the precoat layer, based on the dry weight of the mixture, to catalyze the reaction between the hydrazine and the oxygen whereby hydrazine is removed from the liquid.

44. The method according to claim 43 wherein the powdered activated carbon comprises at least 20 percent by weight of the precoat layer, based on the dry weight of the mixture.

* * * * *